United States Patent [19]

Mundus et al.

[11] Patent Number: 4,642,013
[45] Date of Patent: Feb. 10, 1987

[54] APPARATUS FOR STACKING FLAT ARTICLES

[75] Inventors: Friedhelm Mundus; Fritz Achelpohl, both of Lengerich of Westphalia, Fed. Rep. of Germany

[73] Assignee: Windmoller & Holscher, Lengerich, Fed. Rep. of Germany

[21] Appl. No.: 800,913

[22] Filed: Nov. 25, 1985

Related U.S. Application Data

[63] Continuation-in-part of Ser. No. 371,498, Apr. 23, 1982, abandoned.

[30] Foreign Application Priority Data

Apr. 24, 1981 [DE] Fed. Rep. of Germany ....... 3116400
May 13, 1981 [DE] Fed. Rep. of Germany ....... 3119004

[51] Int. Cl.$^4$ .............................................. B65G 57/04
[52] U.S. Cl. .................... 414/73; 271/189;
271/194; 414/50; 414/752; 414/84; 414/85;
414/77; 414/72; 198/468.8; 198/689.1; 198/422
[58] Field of Search ............... 414/72, 73, 76, 77,
414/43, 50, 75, 78, 84, 82, 83, 752; 271/308,
309, 310, 312, 198, 189, 194, 197, 218;
198/468.8, 689.1, 422

[56] References Cited

U.S. PATENT DOCUMENTS

| 746,651 | 12/1903 | Rockstroh | 271/194 |
| 2,205,767 | 6/1940 | Lamb | 271/218 X |
| 2,836,418 | 5/1958 | Blättner et al. | 271/189 X |
| 3,255,895 | 6/1966 | Klingler | 414/50 X |
| 3,606,310 | 9/1971 | Larson | 271/189 |
| 4,027,873 | 6/1977 | Bishop | 414/73 X |
| 4,275,977 | 6/1981 | Joice | 414/73 X |

FOREIGN PATENT DOCUMENTS

| 2332925 | 6/1973 | Fed. Rep. of Germany . | |
| 1906090 | 4/1978 | Fed. Rep. of Germany | 414/73 |
| 7509635 | 11/1976 | Netherlands | 271/218 |

Primary Examiner—Frank E. Werner
Attorney, Agent, or Firm—Fleit, Jacobson, Cohn & Price

[57] ABSTRACT

In a stacking apparatus for sheets delivered by a double belt conveyor including spaced parallel conveyor belts, a stacking station beneath the discharge end of the conveyor is supplied with sheets by parallel suction arms which move at the conveying speed between the conveyor belts and therebeyond, are lowered to the stacking station to deposit a sheet while the suction effect is interrupted, and are then returned to the conveying plane.

16 Claims, 10 Drawing Figures

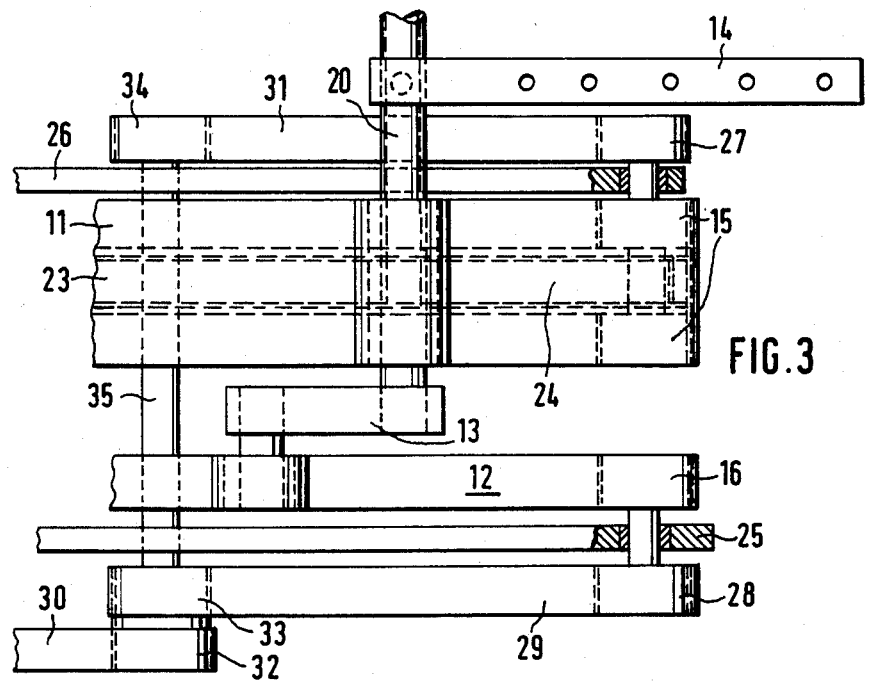
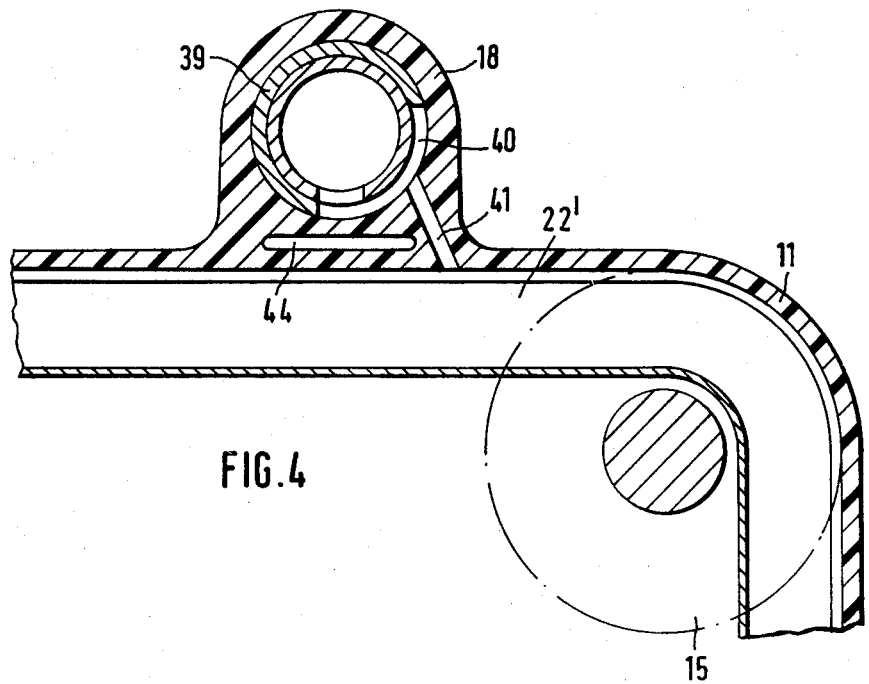

APPARATUS FOR STACKING FLAT ARTICLES

This application is a continuation-in-part of application Ser. No. 371,498 filed April 23, 1982 now abandoned.

The invention relates to an apparatus for stacking flat articles such as tube sections, bags or the like, preferably of floppy and/or light creasable material, comprising a double belt conveyor consisting of a plurality of spaced parallel circulating belts, and, beneath the discharge end thereof, depositing means, a stacking table, stacking conveyor or a stacking magazine.

In, for example, the production of bags of high density or low density polyethylene, their lightness in weight and creasable material which tends to be charged electrostatically presents the difficulty of neatly depositing the bags onto each other to form readily manipulatable stacks which are ready for sale. Such bags can be neatly stacked in practice only if they are held taut and transported from the time they are ejected from the machine until they are deposited.

It is the problem of the present invention to provide an apparatus of the aforementioned kind with which articles of floppy or light or creasable material can also be stacked without an air jet current for holding them taut.

According to the invention, this problem is solved in that near the end of the double belt conveyor there are at least two parallel suction arms which circulate at conveying speed in the gaps between every two belts, are provided with suction air connectors and the upper sides of which are provided with suction apertures and are disposed near the conveying plane, that the suction arms run parallel to themselves over the front end of the lower belt guide of the double belt conveyor, project therebeyond so far that they reach their final position above the depositing means and, after descending to a plane parallel to the conveying plane, moved back until, after deflection into the conveying plane, they are re-accelerated to the conveying speed, and that the suction arm in the arms is so controlled that the supply of suction air, started no later than when the arms leave the gaps between the belts, is interrupted again after or during descent of the suction arms above the depositing means prior to return movement. In the apparatus of the invention, the suction arms receive the articles or bags to be deposited, brake same and release them through an interruption in the suction air only when they have deflected them out of the horizontal direction of movement into the vertical depositing movement. The suction arms quickly escape beneath the dropping articles or bags so that the latter can traverse the remaining drop without obstructions and without the danger of overturning. The apparatus of the invention therefore permits the articles to be kept taut until just before they are deposited.

An apparatus for stacking flat articles, comprising suction arms holding the articles until they are deposited is known per se from DE-OS No. 23 32 925. The suction arms are in star formation and rotatable about a horizontal axis but are only adapted to handle articles provided with a perforated margin and thread them in a suspended form onto laterally arranged rows of needles.

Desirably, the suction arms are secured to vertical carriers hinged to endless belts or chains which run beneath the double belt conveyor offset in height parallel to each other and at equal speeds. The carriers are connected in a crank-like manner to the two endless conveyor means so that, while they are circulating they guide the suction arms secured thereto parallel to themselves.

In the end zone prior to the front direction change of one of the belts or chains there may be a suction box with an open upper slot which is covered by the belt or by a band moving therewith, which are provided in the region of the carrier with an aperture or with a passage opening into the bore of the carrier, through which the suction arms are provided with suction air. The slot of the suction passage is therefore covered by the belt running thereover so that only the aperture in the region of the carrier is provided with suction air.

Desirably, the suction box passed about the rear directionchanging rollers of the belt or chain terminates closely therebehind. This ensures that the supply of suction air to the suction arms is interrupted as soon as the suction arms have been diverted from movement in the conveying direction to vertical movement.

In a further embodiment of the invention, the carrier is mounted on discs which move at the same rotary speed and the axes of which are offset from each other for parallel guidance of the suction arms. The discs may be offset from each other in any desired manner, it only being necessary to provide one connecting carrier on which the carrier carrying the suction arms is vertically secured if the axes of the discs are not disposed under each other in a vertical plane. The discs are provided with a rotary supply for the suction air.

Desirably, the depositing means comprise a front wall with vertical slots through which the suction arms engage during circulation. The wall provides additional guidance for the gently dropping articles, thereby facilitating the formation of edge-aligned stacks.

In another embodiment of the invention, the suction arms are so short that they project only beyond the rear zone of the depositing means. At least two upper belts of the double belt conveyor are provided with suction boxes which extend closely up to the front end of the depositing means and are provided with suction holes or sets of suction holes at the spacing of the workpieces, which holes suction-attract the workpieces only at the leading ends. This construction preferably serves for the depositing of longer workpieces or bags. The suction holes of the upper belts and the suction arms simultaneously release the workpieces above the depositing means so that the workpieces can drop onto the depositing means or the stack being formed thereon.

The apparatus according to the invention permits a plurality of conveying lines to be arranged in parallel, stacking apparatuses being provided behind each of them. The suction arms of all the conveying lines may be secured to a single transverse tube carrying the suction air.

If there is to be no interruption in the sequential supply of the articles to be stacked, the stack must be discharged during the time interval between depositing two articles but this is so short that proper discharging of the finished stack from the stack-forming station cannot be assured. To avoid the need for interrupting the supply of articles to be stacked, it is therefore necessary to allow for intermediate stacking during the time that the last-formed stack is discharged. To create intermediate stacking of the articles which permits efficient discharging of the formed stacks, a further embodiment of the invention therefore provides that supporting arms having suction air apertures can be swung in above the stack, onto which the first article of a further stack can be deposited after the stack has been completed.

After swinging the supporting arms in above the stack to be taken away, its suction air apertures are connected to a source of suction air so that the first article deposited thereon remains fixed in its deposited position. Afer discharge of the last stack from the stack-forming station, the supporting arms suddenly move out beneath the articles that have been deposited in the meantime, so that these articles will drop onto the stacking conveyor belt at the stacking station. Desirably, these supporting arms project over the stack to be discharged only in a marginal zone, so that withdrawal of the supporting arms after stopping the suction air will not cause the articles deposited in the meantime to slip.

Desirably, additional retaining arms can be lowered onto the stack in vertical planes offset from those of the carrier arms used for depositing, moved out of the stacking station together with the stack and returned to a position of readiness above the path of movement of the carrier arms. These retaining arms press the finished stack during the first stage of its discharge so that slipping of the stack is avoided while it is being taken away.

Desirably, the supporting arms are pivotable in a vertical plane disposed in the discharging direction of the stacks over the rear direction-changing roller of the stacking conveyor belt as viewed in the discharging direction into their retaining position above the stack. In a further embodiment of the invention, the retaining arms parallel to the discharging direction are provided in the rear zone with recesses in which the supporting arms engage. Depositing of the subsequent articles is then on the retaining arms, slipping of the subsequently deposited articles during discharge of the last stack with the retaining arms being prevented in that the rear zone of the lowermost article is suction-attracted by the suction air nozzles of the supporting arms and retained thereby.

Desirably, the supporting arms are formed by the upper limbs of pivoted brackets.

Examples of the invention will now be described in more detail with reference to the drawings, wherein:

FIG. 3 is a plan view of the FIG. 2 suction arm guide;

FIG. 4 is a longitudinal section through the belt covering the suction box in the region of the front direction-changing roller with the bearing for the suction arm carrier;

Figure 1:
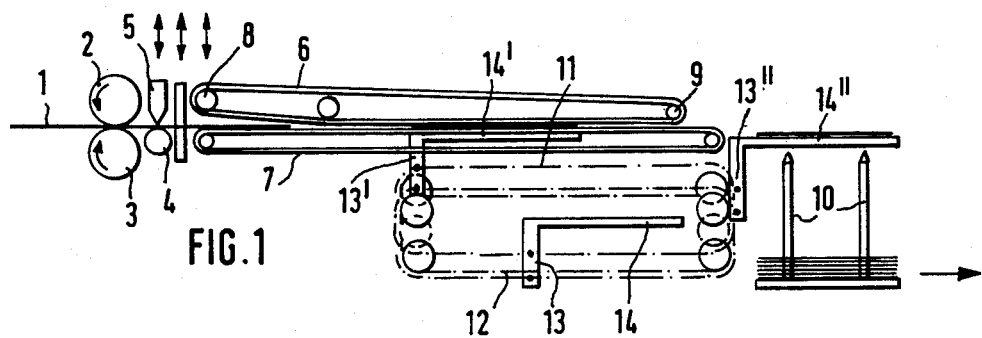
FIG. 1 is a diagrammatic side elevation of a stacking apparatus with suction arm depositing and a depositing station equipped with retaining pins.
Figure 9:
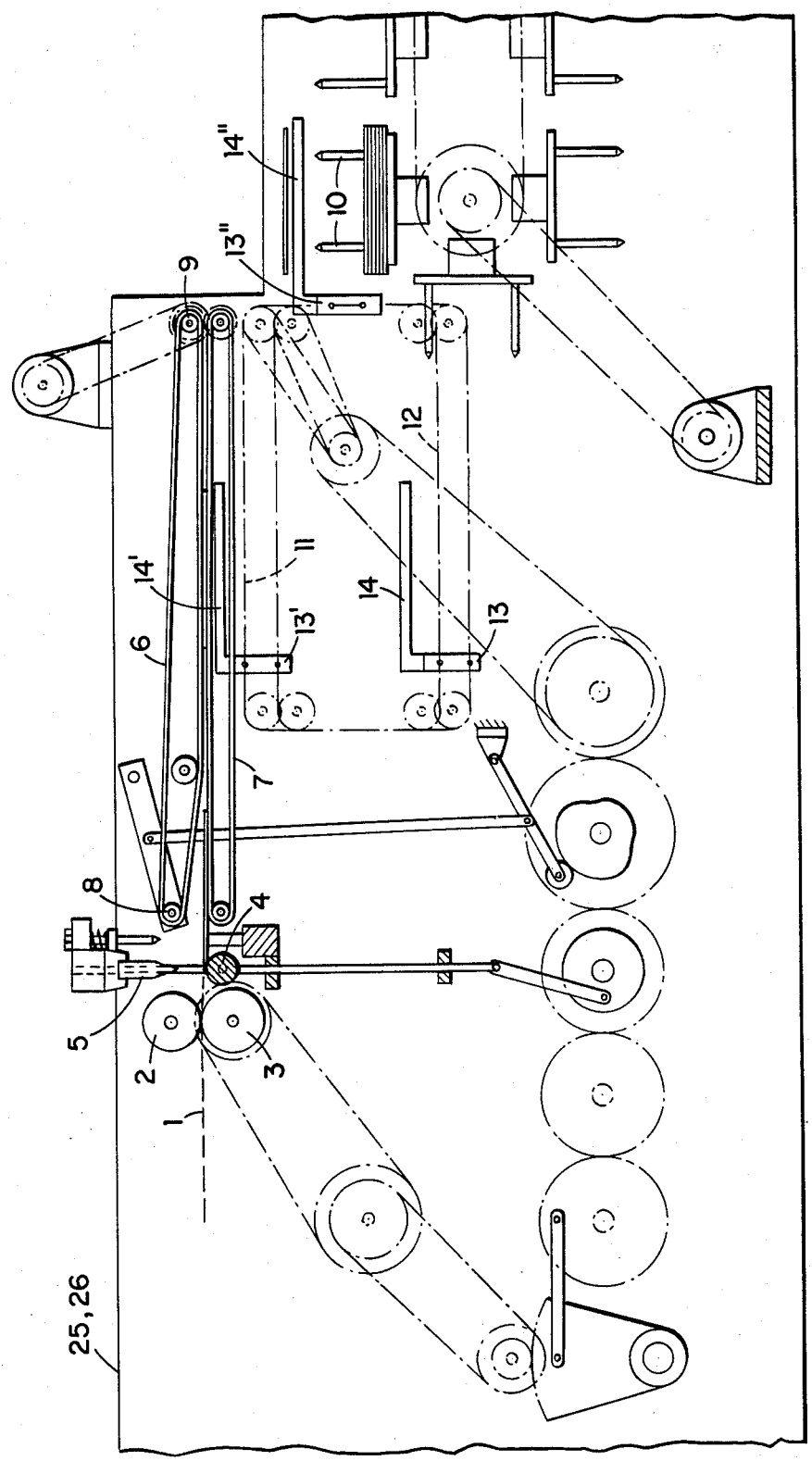
FIG. 9 is a detailed diagrammatic side elevation of the stacking apparatus shown in FIG. 1.

In the apparatus shown in FIGS. 1 and 9, a web 1 of tubular film of floppy lightweight thermoplastic material is advanced by feed rollers 2, 3 and fed to a transverse welding-severing station 4, 5 disposed behind the feed rollers 2, 3 as viewed in the conveying direction. The transverse welding-severing station consists of a severing seam jaw 5 which can be moved up and down and an associated counter-jaw consisting of a welding roller 4.

The individual workpieces severed by the severing seam jaw 5 are introduced between an upper conveyor belt 6 and a lower conveyor belt 7, the rear direction-changing roller 8 of the upper conveyor belt 6 being in the form of a tipper roller to pull off any workpieces adhering to the severing seam jaw. The upper as well as the lower conveyor belt 6, 7 each consist of a plurality of spaced juxtaposed individual belts.

As shown in FIG. 9, a drive system is illustrated for coordinating movement of rollers 2, 3, jaws 5, and roller 8.

Behind and below the front direction-changing roller 9 and the lower conveyor belt 7 of the double belt conveyor there is the stacking station which, in the FIGS. 1 and 7 example, consists of a table plate to one side of which there are secured two vertical pins 10 onto which there are threaded for stacking purposes the bags which are provided with perforations at one margin. The table plate may be secured to an endless chain or the like shown in FIG. 9 for discharging the finished stacks. The table plates are mounted on a conveyer for movement away from the stacking apparatus.

Beneath the double belt conveyor, circulating belts 11, 12 are provided offset in height and parallel to each other. Vertical carriers 13, 13', 13" mounted on these belts carry with their upper ends the suction arms 14, 14', 14" which are disposed in horizontal planes. In the end region of the double belt conveyor, the suction arms run between the individual belts of the lower conveyor belt 7 in the conveying plane and suction-attract the delivered bags in the sequence of the passage of the suction arms. The suction arms lead the bags in the manner shown in FIGS. 1 and 7 beyond the front end of the double belt conveyor and thread these onto the pins 10 of the stacking station during their vertical movement. After the suction air supply has been switched off, the suction arms are withdrawn from the stacking station from beneath the last bag to be delivered. A drive for the suction arms is keyed to the drive system for rollers 2, 3, jaws 5, and roller 8 so that the passage of the bags through the stacking apparatus is coordinated.

Figure 2:
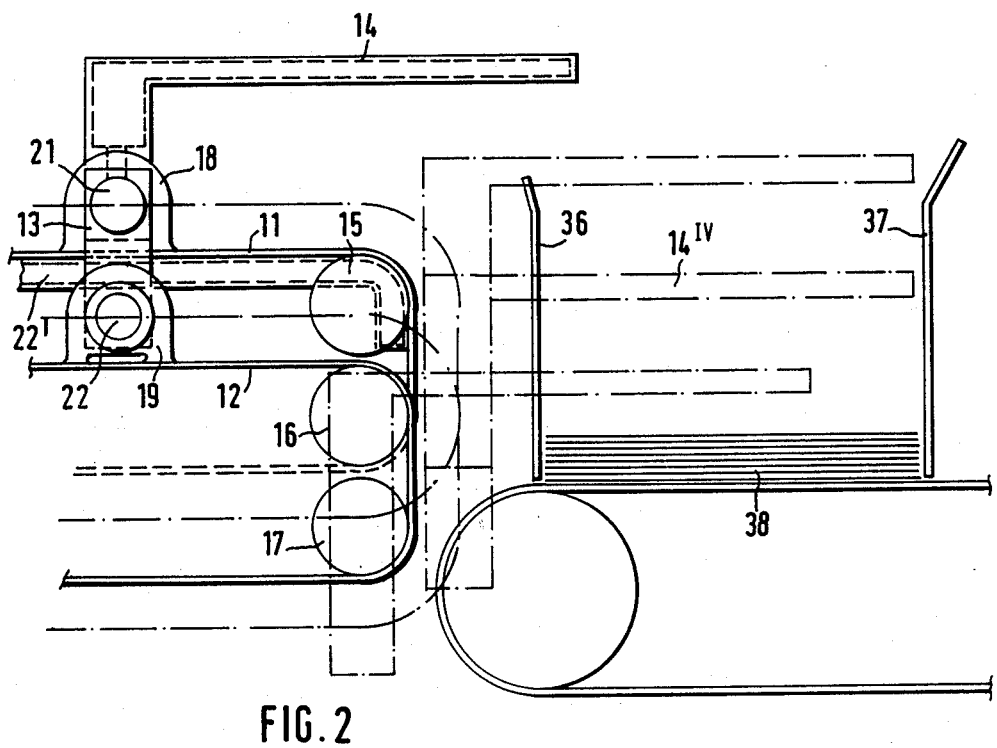
FIG. 2 is a diagrammatic side elevation of the suction arm guide with a stacking magazine.
Figure 5:
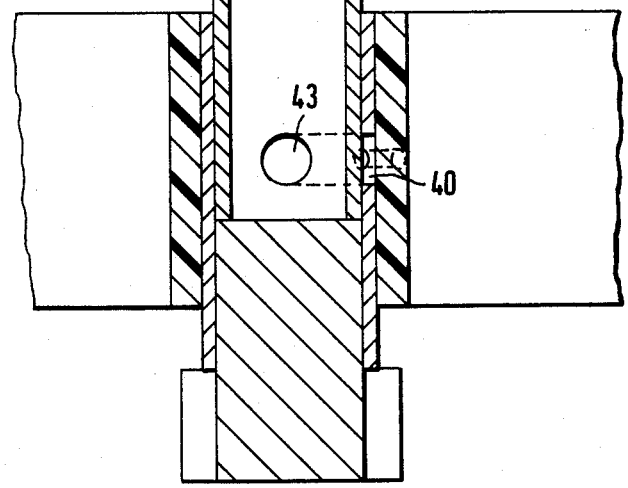
FIG. 5 is a section through the bearing of the FIG. 4 suction arm carrier.

The guide for the suction arms 14, 14', 14" is shown in more detail in FIGS. 2 and 3. The upper belt 11 passes over the roller 15 and a lower roller of which the axis is aligned with the axis of the roller 16 of the lower belt 12. The lower belt 12 returns over the lower direction-changing roller 17. The belts 11, 12 are provided with bearing beads 18, 19 for mounting the carriers 13. The centre lines of the bearings are disposed in a vertical plane so that the carriers 13 will always be vertical while they are circulating.

The carriers 13 are connected in a manner shown in FIG. 3 to a tube 20 on which the horizontal suction arms 14 are placed.

The paths of the centre lines of the bearings 21, 22 of the carrier 13 are shown in chain-dotted lines in FIG. 2.

The upper belt 11 covers an upper slot in the suction box 22 which is downwardly flanged in the region of the direction-changing roller 15 and terminates approximately in the region of the lower surface line of the roller 15. The belt 11 is provided with teeth on the underside at both sides and has an unserrated central portion 23 which, as is shown in FIG. 3, covers the slot 24 in the suction box 22.

The direction-changing rollers 15, 16, 17 are mounted in rolls 25, 26 of the frame as is shown in FIG. 3. At the sides opposite the walls of the frame, drive rollers 27, 28 are secured to the roller shafts. The drive takes place by way of belts 29, 30, 31 which run over rollers 32, 33, 34. The shaft 35 of the rollers 32, 33, 34 is disposed at such a lower level that the carriers 13 can move past thereabove without hindrance.

In the embodiment shown in FIG. 2, the depositing station is in the form of a magazine. It consists of a rear wall 36 provided with vertical slots and a front bounding wall 37 which can be raised for discharging the formed stacks. Side walls (not shown) are also provided. The base of the stacking station is formed by the stacking conveyor belt 38 which, after lifting the front wall 37, takes the stacks away in sequence with their formation.

FIG. 2 shows the suction arms 14 at various positions during their passage through the stacking station. The supply of suction air is stopped when the suction arms 14 are approximately in their position $14^{IV}$. Thereafter, the suction arms are removed from the articles to be deposited in that they are accelerated downwardly and pulled out of the magazine.

FIG. 4 more clearly shows the belt 11 which covers the upper slot 24 of the suction box 22. A bearing sleeve 39 is vulcanised into the bead 18 and is provided with a circumferentially extending slot 40 into which the passage 41 opens which communicates with the suction passage 22. The tube 42 carrying the suction arms 14 is rotatably mounted in the bearing sleeve 39. In the region of the slot 40, the tube 42 is provided with a bore 43 so that the supply of suction air to the tube 42 is maintained during rotation of the tube relatively to the bearing sleeve 39.

The length of the slot 14 can be such that it also serves as a control slot for the supply of suction air.

Beneath the bead 18, the belt is provided with an aperture 44 which ensures that the belt will pass over the direction-changing rollers without obstruction.

Figure 6:
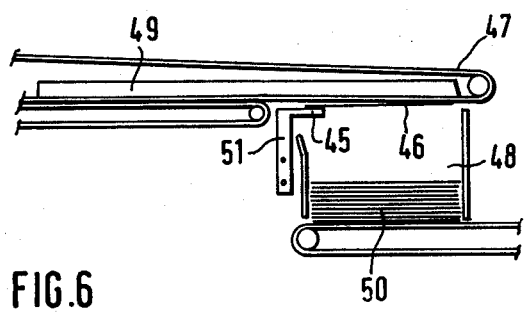
FIG. 6 is a diagrammatic side elevation of a modified embodiment of the suction arm depositing apparatus.

In the FIG. 6 embodiment, the suction arms 45 are so short that they suction-attract only the trailing ends of the workpieces 46. At the same time, the upper conveyor belt 47 of the double belt conveyor is extended beyond the depositing station 48. Every two lateral belts 47 of the upper conveyor belt 47 cover suction boxes 49. The belts 47 are provided with holes at the same spacing as the bags 46 to be stacked and through these holes the leading ends of the bags 46 are attracted under suction. As soon as the bag 46 has reached its position as shown in FIG. 6, the supply of suction air is interrupted so that the bag 46 drops onto the stack 50. The guide for the support 51 of the suction arms 45 corresponds to the example hereinbefore described.

Figure 7:
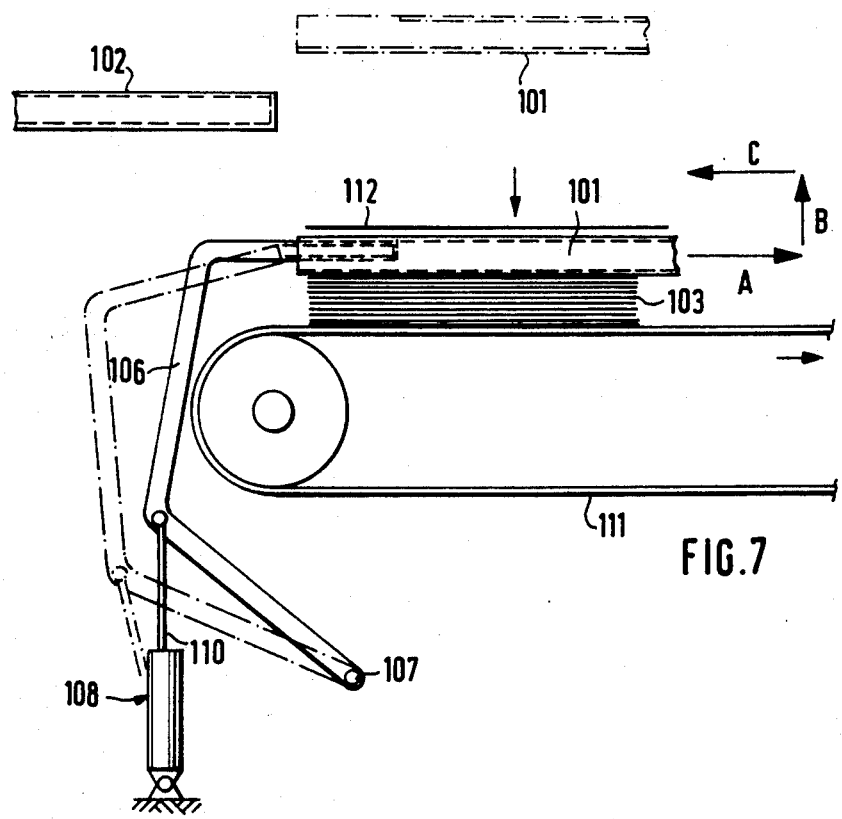
FIG. 7 is a diagrammatic side elevation of a different embodiment of stacking station.
Figure 8:
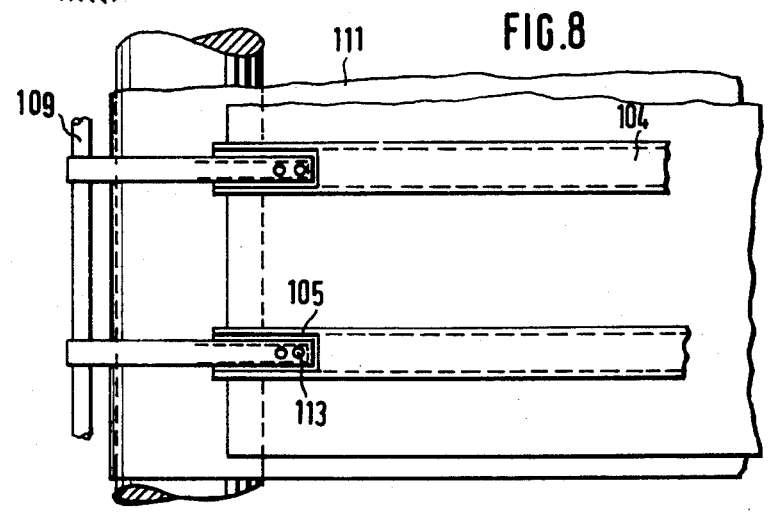
FIG. 8 is a plan view on the FIG. 7 stacking station.
Figure 10:
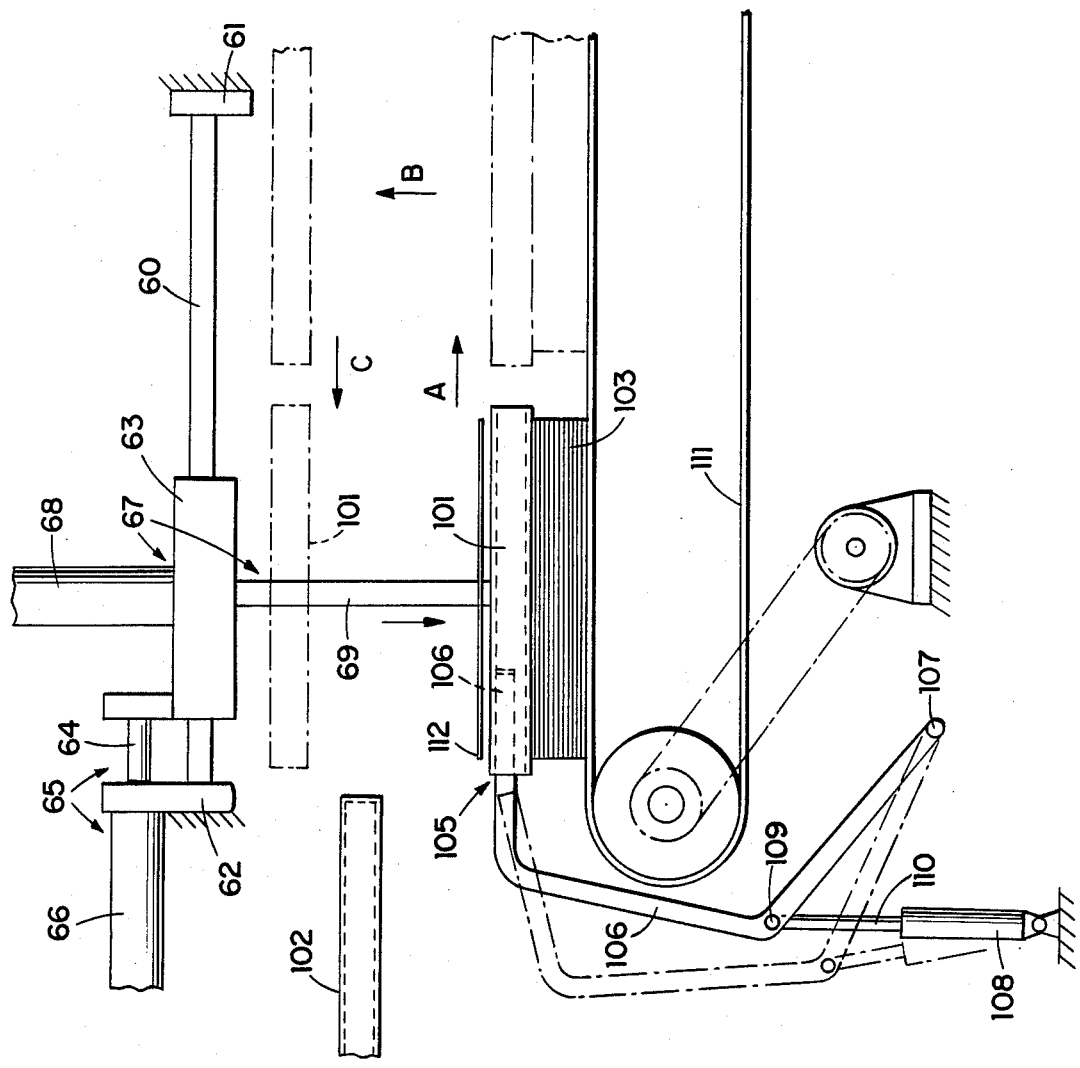
FIG. 10 is a detailed diagrammatic side elevation of the stacking station shown in FIG. 7.

In the embodiment shown in FIGS. 7, 8 and 10, the articles 112 to be stacked are deposited at the stacking station by the carrier arms 102. Above the range of movement of the suction or carrier arms 102, there are the retaining arms consisting of a rake 101, which are mounted in a manner shown in FIG. 10 and provided with drive means.

As soon as the last bag of a stack 103 to be formed has been deposited by the suction arms 102, the rake 101 is lowered from its upper position shown in broken lines to the lower position shown in full lines and it thereby presses the stack 103 together as regulated to a desired degree of compression, to press the stack 103 prior to the stack 103 being conveyed with rake 101 along conveyer 111 as rake 101 is moved by piston cylinder 67 which is guided along rod 60.

As is shown in FIG. 8, the rake consists of a plurality of juxtaposed square tubes 104 having recesses 105 near the front. A plurality of fingers 106 forming the supporting arms engages in these recesses. These fingers 106 are swung about a common shaft 107 by means of a pneumatic piston-cylinder unit 108 out of the position shown in chain-dotted lines into the position shown in full lines in the drawings. For the purpose of stabilising the individual fingers 106 with respect to each other, they are interconnected by a shaft 109 which is also engaged by the piston rod 110 of the pneumatic piston-cylinder unit 108. From the position shown in FIG. 7, the finished stack 103 is removed from the stacking zone by switching on the conveyor belt 111 and by moving the rake 101 in the direction of the arrow A. The first bag 112 of the new stack to be formed that has in the meantime been brought up by the suction arms 102 is held by the suction holes in the fingers 106. If the rake 101 has been moved sufficiently far out of the stacking zone, the rake is raised in the direction of the arrow B and executes further movement in the direction C to return to its position shown in FIG. 7 in broken lines. During movement of the rake 101 in the direction B, the suction air for the fingers 106 is switched off and the fingers 106 are returned by the pneumatic piston-cylinder unit 108 to the position shown in broken lines in FIG. 7.

The formation of a further stack then takes place in an analogous manner.

In FIG. 10, there are two parallel guide rods 60 which are mounted on fixed supports 61 and 62. A slide 63 is movably positioned on the two guide rods 60. The movement of the slide 63 results from the piston rod 64 of a piston cylinder unit 65, the cylinder 66 of which is rigidly mounted on the support 62. The slide 63 carries a piston cylinder unit 67 with cylinder 68 being connected directly to the slide 63. Piston rod 69 of piston cylinder unit 67 holds the support arms 101, which due to movements of the piston rods 64 and 69, move through the four positions illustrated by arrows.

What is claimed is:

1. Apparatus for stacking flat articles such as tube sections, preferably of floppy, creasable material, said apparatus comprising:

a double belt conveyor movable at a conveying speed and defining a conveying plane therebetween, said double belt conveyor including a discharge end and a plurality of spaced parallel circulating belts defining gaps therebetween, deposting means located beneath the discharge end, at least two parallel suction arms located adjacent to the discharge end and being movable in the gaps defined between said plurality of spaced parallel circulating belts, each one of the at least two parallel suction arms being located in one of said gaps, upper sides of said at least two parallel suction arms defining suction apertures and being positionable adjacent said conveying plane, air suction means being connected to said at least two parallel suction arms, means for moving said at least two suction arms parallel to themselves and adjacent to the double belt conveyor at said conveying speed until said at least two parallel suction arms project beyond said double belt conveyor at a position above said depositing means and, afer descending to a plane parallel to the conveying plane, moving rearwardly and ascending to said conveying plane, and reaccelerating said at least two suction arms to said conveying speed, and said air suction means being so controlled that the supply of suction is started before said at least two parallel suction arms leave the gaps defined between the plurality of spaced parallel belts and is stopped before completion of the descent of the suction arms from above the depositing means to said plane parallel to said conveying plane, finger-like supporting arms defining suction air apertures, means for moving said finger-like supporting arms above a stack of articles mounted on said depositing means, onto which a first article of a further stack is deposited after said stack of articles is complete, retaining arms located in vertical planes offset from vertical planes passing through said at least two parallel suction arms, means for moving said retaining arms onto said stack of articles and away from the depositing means together with said stack of articles and returning said retaining arms to a position of readiness above said depositing means, and recesses defined by a rear end of said retaining arms being engagable by the finger-like supporting arms.

2. Apparatus according to claim 1, characterized in that the suction arms are secured to vertical carriers hinged to endless belts which run beneath the double belt conveyor offset in height parallel to each other and at equal speeds.

3. Apparatus according to claim 2, characterised in that in an end zone located in front of a front direction-changing roller of one of the endless belts there is a suction box defining an open upper slot which is covered by the one endless belt moving therewith, provided in the region of the vertical carriers for said at least two parallel suction arms is an aperture opening into a bore defined by the carrier, through which the suction arms are provided with the suction air.

4. Apparatus according to claim 3, characterized in that a bearing of the carrier is vulcanized into said double belt conveyer of elastomeric material.

5. Apparatus according to claim 4, characterized in that the suction box passed about a rear direction-changing roller of the belt terminates closely therebehind.

6. Apparatus according to claim 1, characterised in that a carrier for each of said at least two parallel suction arms is mounted on discs which move at the same rotary speed and the axes of which are offset from each other for parallel guidance of the suction arms.

7. Apparatus according to claim 6, characterised in that the depositing means comprise a front wall with vertical slots through which the at least two parallel suction arms engage during circulation.

8. Apparatus according to claim 7, characterised in that the depositing means comprise a rear bounding wall which can be at least one of raised and tilted.

9. Apparatus according to claim 8, characterised in that the at least two parallel suction arms are so short that they project only beyond a rear zone of the depositing means and that at least two upper belts of the double belt conveyor are provided with suction boxes which extend closely up to the front end of the depositing means and are provided with suction holes at the spacing of workpieces, which holes suction-attract the workpieces only at their leading ends.

10. Apparatus according to claim 9, characterised in that the depositing means are provided with vertical pins.

11. Apparatus according to claim 10, characterised in that the at least two parallel suction arms are secured to a respective transverse tube carrying the suction air.

12. Apparatus according to claim 1, characterised in that the finger-like supporting arms project over said stack of articles only at a marginal zone.

13. Apparatus according to claim 12, characterised in that the supporting arms are pivotal in a vertical plane disposed in the discharging direction of the stacks over a rear direction-changing roller of the depositing means as viewed in the discharging direction into their retaining position above the stack.

14. Apparatus according to claim 13, characterised in that the supporting arms are formed by upper limbs of pivoted brackets.

15. Apparatus according to claim 14, characterised in that piston-cylinder units are provided to pivot the supporting arms.

16. An apparatus for stacking flat articles, said apparatus comprising:

a first conveying means for transporting flat articles towards one end, a second conveying means for receiving a stacked plurality of flat articles and moving said stacked plurality of flat articles, a carrying arm for transferring said flat articles from said one end and depositing said flat articles on said second conveying means in a stacked condition, a retaining arm lowerable from a position above the carrying arm to a position compressing the stacked plurality of flat articles on said second conveying means, means for moving said retaining arm along the conveying path of said second conveying means while compressing the stack of flat articles and returning said retaining arm to said position above the carrying arm, a recess defined in a rear area of said retaining arm, a supporting arm, means for moving said supporting arm over the stacked plurality of flat articles compressed by the retaining arm to engage said recess defined by said retaining arm, and means defined by said supporting arm for holding an article transferred by said carrying arm to the plurality of stacked articles compressed by the retaining arm to subsequently deposit said article on the second conveying means after the retaining arm and the stack of flat articles have been moved by the second conveying means.

* * * * *